(No Model.)
F. B. COCHRAN.
COIN OPERATED VENDING MACHINE.
No. 440,470. Patented Nov. 11, 1890.
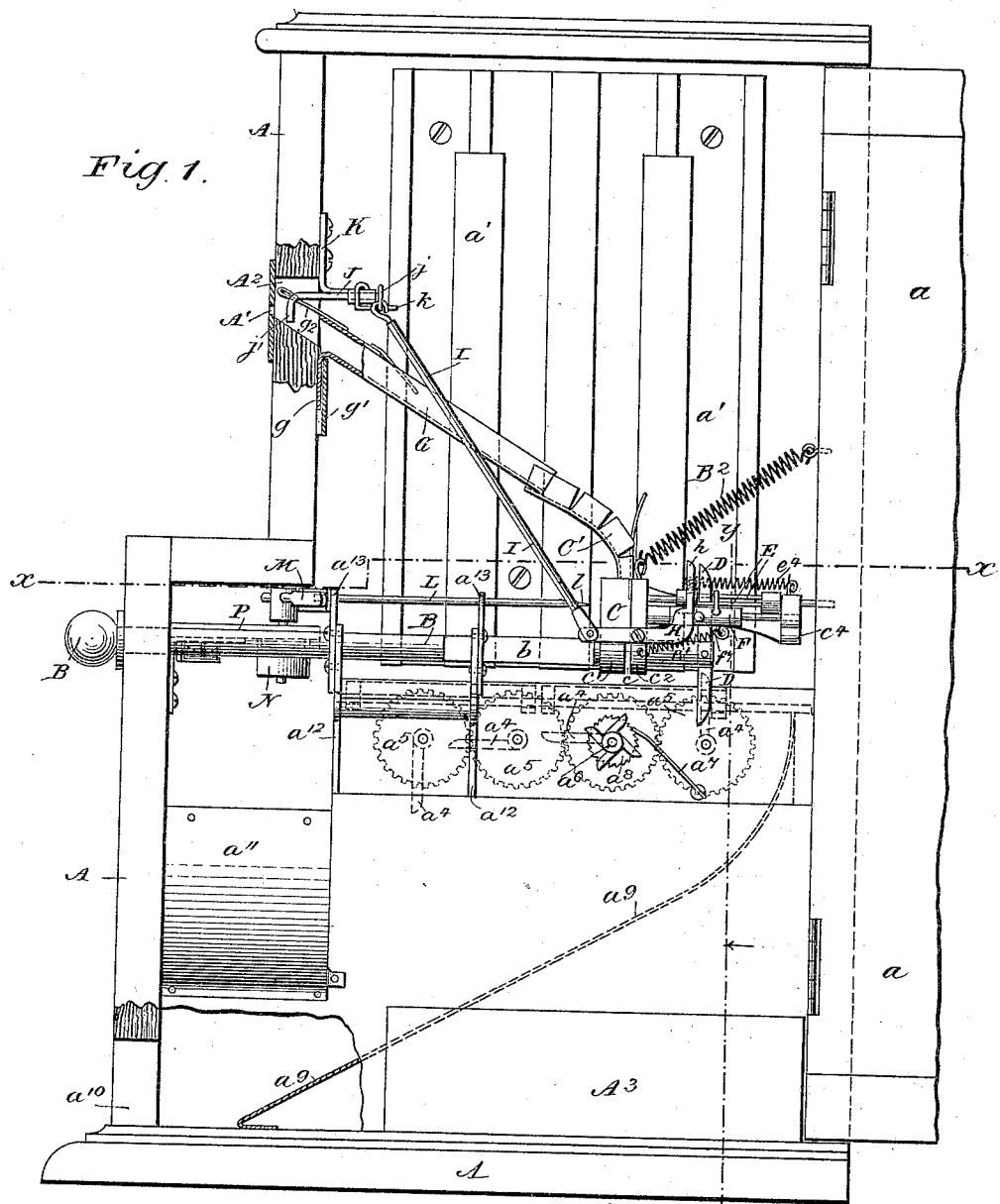
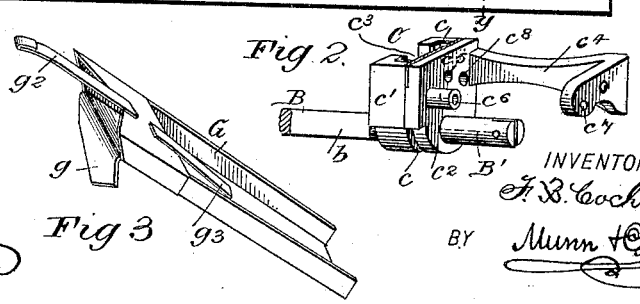
WITNESSES:
Paul Johst
C. Sedgwick
INVENTOR:
F. B. Cochran
BY Munn & Co.
ATTORNEYS (No Model.) 3 Sheets—Sheet 2.
F. B. COCHRAN.
COIN OPERATED VENDING MACHINE.
No. 440,470. Patented Nov. 11, 1890.
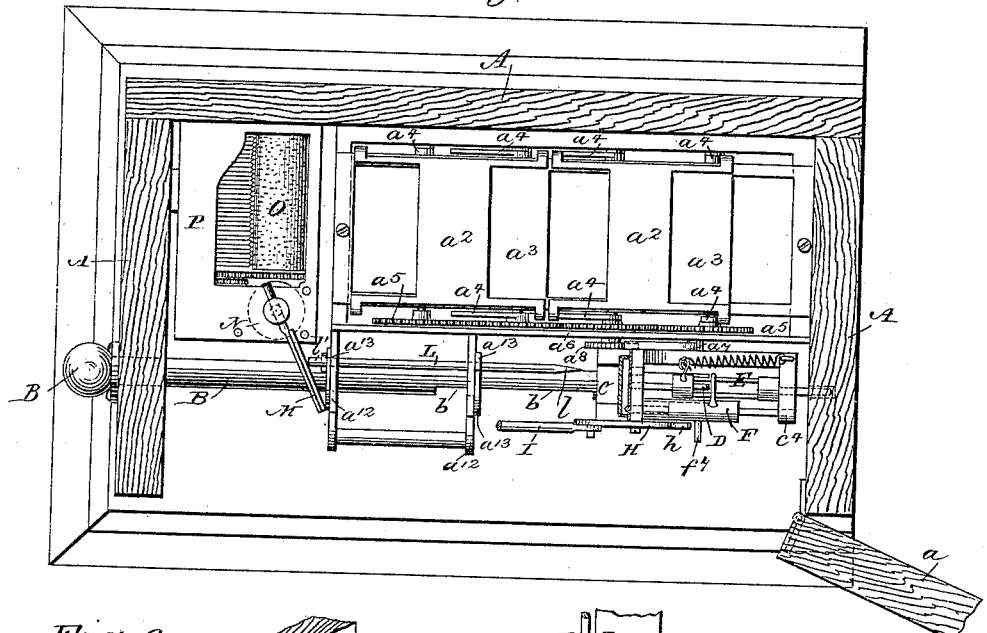
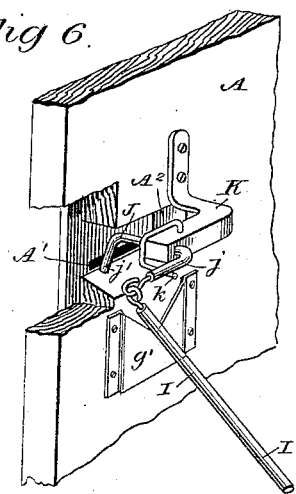
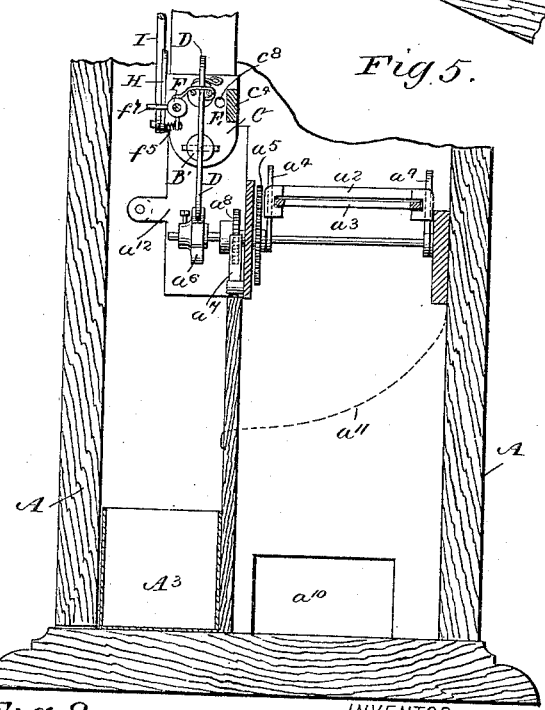
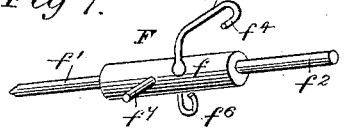
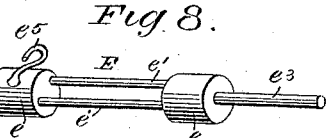

(No Model.) 3 Sheets—Sheet 3.

F. B. COCHRAN.
COIN OPERATED VENDING MACHINE.

No. 440,470. Patented Nov. 11, 1890.

WITNESSES:
Paul Johst
C. Sedgwick

INVENTOR:
F. B. Cochran
BY
Munn & Co
ATTORNEYS

UNITED STATES PATENT OFFICE.

FREDERIC B. COCHRAN, OF BROOKLYN, NEW YORK.

COIN-OPERATED VENDING-MACHINE.

SPECIFICATION forming part of Letters Patent No. 440,470, dated November 11, 1890.

Application filed July 8, 1890. Serial No. 358,036. (No model.)

*To all whom it may concern:*

Be it known that I, FREDERIC B. COCHRAN, of Brooklyn, in the county of Kings and State of New York, have invented a new and Improved Coin-Operated Vending-Machine, of which the following is a full, clear, and exact description.

My invention relates to machines of that class which automatically deliver chocolate or other confections and cigarettes or other small wares after deposit of a proper coin into its casing.

The invention has for its object to provide a simple, comparatively inexpensive, and efficient machine of this character operated to deliver the goods by means of a plunger actuated from outside the machine-casing, and causing music to be produced as each piece of goods paid for is delivered to the purchaser.

A further object of the invention is to provide safeguards against choking or clogging of the machine and also against the operation of it more than once by the same coin.

The invention will first be described, and then will be particularly pointed out in the claims.

Reference is to be had to the accompanying drawings, forming a part of this specification, in which similar letters of reference indicate corresponding parts in all the figures.

Figure 9:
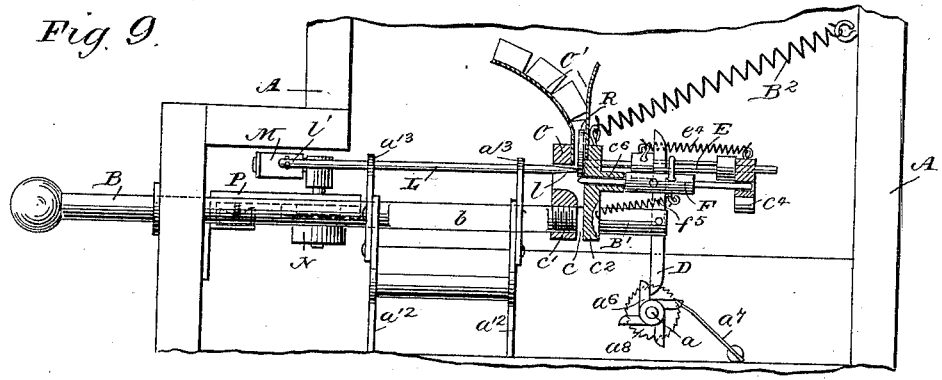
Figure 10:
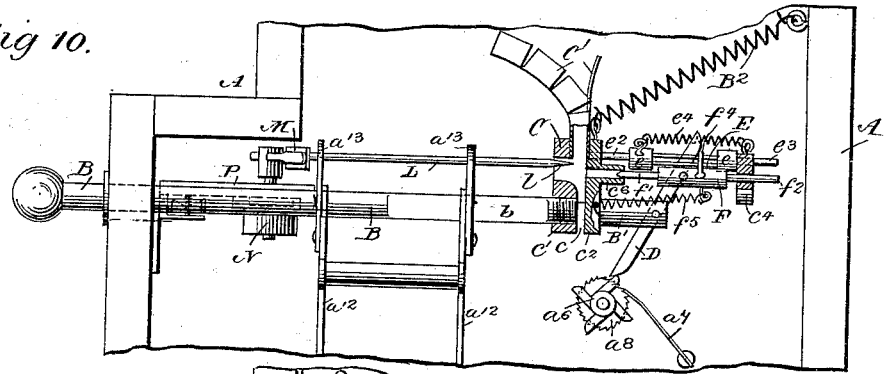
Figure 11:
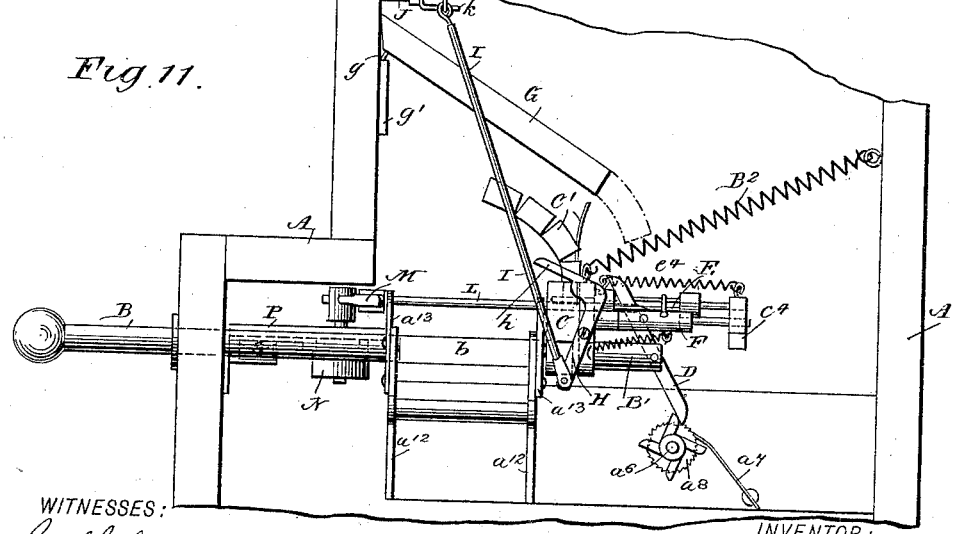
Figure 12:
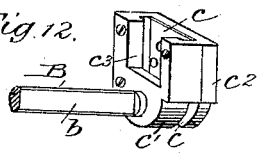

Figure 1 is a side elevation of my improved vending-machine with the door open and with parts broken away. Fig. 2 is a perspective view of the rear or inner part of the plunger and its coin receptacle or bucket. Fig. 3 is a perspective view of the coin-chute, which in use is held to the inside of the front of the machine-casing. Fig. 4 is a plan view of the machine with the casing in horizontal section on the line $x\ x$ in Fig. 1. Fig. 5 is a detail vertical transverse sectional rear view taken on the line $y\ y$ in Fig. 1. Fig. 6 is an inner detail broken perspective view of the front wall of the casing at the coin-slot and the adjacent mechanism. Fig. 7 is a perspective view of the endwise movable coin-retainer drawn about full size. Fig. 8 is a full-size perspective view of the traveler device, which allows operation of the goods-delivery mechanism by the deposited coin as the plunger is drawn outward. Fig. 9 is a partly sectional side view of the plunger mechanism as the plunger is being drawn outward with the coin interposed in front of the traveler to cause the plunger-lever to actuate the goods-delivery mechanism. Fig. 10 is a partly sectional side view showing the action of the plunger-lever in discharging the coin as the plunger is being retracted. Fig. 11 is a detail side view illustrating the positions of the plunger mechanism when the plunger is drawn outward and a coin is not deposited in the plunger bucket or receptacle in front of the traveler, and Fig. 12 is a front perspective view of a portion of the plunger and attached coin bucket or receptacle.

The casing A of the vending-machine is in Fig. 1 of the drawings shown shorter than in actual use for greater convenience of illustration. The casing is preferably made with a deeper lower part containing the plunger and goods-delivery mechanisms, and at one side has a hinged door $a$, giving access to its interior. To the side of the casing opposite the door is screwed or otherwise fastened a comparted receptacle $a'$, into which the chocolates or goods to be sold are placed, and from which they are delivered upon slides $a^2$, which reciprocate upon an apertured table $a^3$, which is sustained within the casing. These slides are actuated alternately to drop one piece of goods each time a proper coin is deposited in the machine, and by means of tappet-arms $a^4$, which are on shafts of a train of gear-wheels $a^5$, which are turned intermittently by a star or tappet wheel $a^6$, which is actuated by a lever on the plunger, as hereinafter more fully explained, and is fixed to one of the four shafts of the train of gear-wheels. A pawl $a^7$, acting on a ratchet-wheel $a^8$ on the tappet-wheel shaft, prevents backward movement of the gearing.

The piece of goods falls from the slide-table $a^3$ onto an inclined chute $a^9$, which delivers it to the purchaser at a discharge-opening $a^{10}$ in the front of the casing. I do not claim in this application the peculiar arrangement of the slotted table and reciprocating slides thereon in or of themselves, but only in combination with the plunger B of the machine and as hereinafter set forth. Directly above the goods-delivery opening $a^{10}$ is fitted in the casing a guard-plate $a^{11}$, which prevents introduction through the opening $a^{10}$ of a wire or instrument to tamper with the plunger, the goods-delivery mechanism, or the music-producing device, which is actuated by or from the plunger, as hereinafter explained.

The plunger B is fitted to slide in the front of the casing A and in a couple of brackets or bearing-plates $a^{12}$ $a^{12}$, which are held, preferably, to the goods-delivery-mechanism frame. The plunger is held against turning axially by the bearing of a flattened side portion $b$ of it against one of two bracket-arms $a^{13}$ $a^{13}$, secured to the brackets $a^{12}$ and sustaining a sliding rod, which is actuated by the coin to wind up the spring-barrel of the music-box, as hereinafter more fully described. Near its inner end the plunger is provided with a peculiarly-formed coin bucket or receptacle C, and at its back or inner end B' is slotted vertically to receive a lever D, which is pivoted in the slot and normally stands in vertical position.

As most clearly shown in Figs. 1, 2, and 12 of the drawings, the coin bucket or receptacle C is made in two parts, a front part $c'$, fixed to the main front portion B of the plunger, and a rear part $c^2$, to which the inner end B' of the plunger-bar is fixed. The part $c'$ is recessed or cut away vertically at its center portion to provide between the two parts of the bucket a slot $c$ for the coin, and at its front face the part $c'$ is cut away to provide a front opening $c^3$, communicating with the coin-slot and allowing pasteboard or soft-metal disks to be forced out through the opening $c^3$ by the traveler E, as hereinafter more fully explained. The two parts of the coin bucket and plunger are held together as one piece or structure by screws, as shown best in Fig. 12 of the drawings. Between the two parts of the coin-bucket is clamped the lower end of a chute C', into which a coin passed into the casing A through the coin-slot A' and down a detachable chute G, held to the casing, falls to enter the coin-slot $c$ of the bucket. This primary coin-chute G is shown detached in Fig. 3 of the drawings, and is made of sheet metal, open at the top for most of its length, and provided at its front end with a down-bent tab $g$, which is adapted to enter a keeper $g'$, fixed to the inside of the front of the casing A below an opening $A^2$ therein. This chute G also has an upper forward projection $g^2$, which enters the opening $A^2$ and stands above the coin-slot A' of the casing to guide the coin downward along the chute. A tail-piece $g^3$, projecting rearward and downward into the chute from its front upper portion, also guides the coin and prevents its jumping from the chute. In practice the chute C', instead of curving upward and forward, as shown in the drawings, will be cut off much shorter, and the lower end of the chute G will be curved downward, as indicated in dotted lines in Fig. 11 of the drawings, to discharge the coin safely into the chute C' and the coin-slot of the plunger-bucket. The two chutes C' G will be relatively arranged to always allow the chute C' to be drawn forward from or past the lower end of the chute G as the plunger is operated.

I will next describe the traveler E and coin-retainer F, which operate in conjunction with each other and the plunger B and the plunger-lever D to perform several important functions of the machine.

The plunger coin-bucket C is provided with a rearwardly-extending angular bracket-arm $c^4$, in the lateral extremity of which and in the bucket are provided bearings for opposite end parts of both the traveler and retainer. The traveler E is made, preferably, with two opposite heads $e$ $e$, connected by two parallel wires $e'$ $e'$, between which the upper end of the plunger-lever D projects to allow the lever to move the traveler endwise as its opposite end pins or stems $e^2$ $e^3$, which are fixed in the heads $e$ $e$, slide in holes provided for them in the coin-bucket and its bracket. A spring $e^4$, attached at opposite ends to the bracket and to a loop or eye $e^5$ on the front head $e$ of the traveler, normally draws the traveler rearward until its rear head $e$ strikes the end of the bracket. The front stem $e^2$ of the traveler moves in a hole $c^5$ in the rear wall of the bucket, and, preferably, at the center of a coin or a disk of like size held in the coin-slot $c$ by the retainer F. The end of the traveler-stem $e^2$ is sharpened sufficiently to enable it to pierce a paper or light soft-metal disk, which may be deposited in the coin-bucket, the front opening $c^3$ of which is but a little narrower than the coin-slot, which allows the traveler-stem $e^2$, by bending a paper or sheet-metal disk, which it will not readily pierce, to force said disk through the opening $c^3$, and without operating the goods-delivery mechanism, which also will not be operated when the traveler-pin pierces the disk. The traveler is shown clearly in Fig. 8 of the drawings.

The coin-retainer F, which is shown detached in Fig. 7 of the drawings, is made with a large body portion $f$, from which project front and rear pins or stems $f'$ $f^2$, which move, respectively, in apertures made in the rear part $c^2$ of the coin-bucket and in a boss or projection $c^6$ thereof and in a hole $c^7$, made in the end lug of the bracket $c^4$. To the retainer-body $f$ is fixed a laterally-extending wire loop $f^3$, which crosses the two wires $e'$ $e'$ of the traveler E behind the plunger-lever D, and hooks around beneath one or both of these wires $e'$ by its outer end $f^4$. A spring $f^5$, held at opposite ends to a loop $f^6$ on the retainer and to the coin-bucket, normally draws the retainer forward until the front end of its body portion $f$ stops against the coin-bucket or the projection $c^6$ thereon, at which time the preferably beveled or sharpened extremity of the front stem $f'$ of the retainer projects sufficiently into or at such place across the coin-slot $c$ of the bucket C to hold the coin therein until the retainer is drawn backward either by the operation of the plunger-lever D or on the action of a trip-lever H, which is fulcrumed to the side of the coin-bucket and has an upwardly-extending stem $h$, which normally stands in front of a pin $f^7$, which projects from the side of the retainer, and is held in proper position or about horizontal by the engagement of the loop $f^3$ with the wires $e'$ of the traveler.

The trip-lever H is pivotally connected at its forward end with a rod I, which extends upward and forward, and at its upper end is linked suitably to the inner horizontal arm $j$ of a double-cranked lever J, which is journaled in a bearing-bracket K, fixed to the inner face of the front of the casing A and overhanging its opening $A^2$. The front or outer crank-arm $j'$ of the lever J is bent downward nearly at right angles to its rear crank-arm $j$ and crosses the coin-slot $A'$ of the casing, as most clearly shown in Figs. 1 and 6 of the drawings. A stop pin or wire $k$ in the bracket K underlies the inner crank-arm $j$, and limits the motion of the double-cranked lever when its outer crank is properly disposed across the slot $A'$, to allow the lever to be turned by a coin inserted in said slot, and whereby the rod I will be drawn upward and will swing the lever H to cause its stem $h$ to strike the pin $f^7$ and push back the coin-retainer F each time a coin is passed through the slot $A'$ into the chutes G C', which guide it to the bucket C of the plunger.

In the bracket-arms $a^{13}$ $a^{13}$, hereinbefore mentioned, is fitted to slide a rod L, which, at its inner end $l$, is pointed or sharpened, and is adapted to work through the front opening $c^3$ of the coin-bucket C and across the coin-slot $c$ and through a hole $c^8$ in the rear side or portion $c^2$ of the bucket. The forward end $l'$ of the rod L is presented to a crank-arm M, which is connected to the shaft or axis of the spring-motor N, which operates the barrel O of a music-box P, having a series of elastic tines or plates acted on by the barrel-pins to produce music. It is obvious that when a proper coin is in the slot $c$ of the coin-bucket C and the plunger is drawn outward, the coin will, by pressure on the forward end $l$ of the rod L, force said rod outward and cause it to turn the spring-barrel lever or crank-arm M and wind up the spring of the music-box, and as the plunger is released and is retracted the spring-motor N will turn the music-box barrel O and produce music until the motor-arm M stops against the front bracket-bearing $a^{13}$ or other suitable detent provided for it in the machine-casing, to and within which casing the music-box is safely fastened in any approved manner. Should a paper or soft-metal disk be deposited in the coin-bucket slot $c$ and the plunger B then be drawn outward, the sharp inner end $l$ of the rod L will pass through the disk and the hole $c^8$ of the coin-bucket, and the rod will not be moved endwise, and consequently the music-box spring will not be wound up and no music will be produced as the plunger is retracted.

I will now briefly describe the continuous operation of the machine with more special reference to Figs. 1, 9, 10, and 11 of the drawings.

When the plunger B is drawn fully inward by its retracting-spring $B^2$, the mechanism of the machine occupies normal relative positions. (Shown in Fig. 1 of the drawings.) If, now, a coin—one cent, for instance—be passed into the casing-slot $A'$, the coin will strike and swing to one side the arm $j'$ of the crank-lever J and will draw on the rod I and actuate the lever H to press back the retainer F, and thereby for an instant withdraw its end stem $f'$ from the coin-slot $c$ of the bucket C to allow any coin or other substance which had been retained by the stem $f'$ to drop from the bucket, whereupon the retainer will be at once drawn forward by the spring $f^5$ in time to have its stem $f'$ catch and retain the coin which has just been deposited and by or through which the retainer had been moved backward to clear the coin-slot of the bucket, as just described. The two levers H J are then restored to normal positions by the weight of the rod I, which connects them. As the coin now held in the bucket C by the retainer-stem $f'$ stands in front of the stem or pin $e^2$ of the traveler E, it is manifest that as the plunger is drawn outward the coin will prevent independent forward movement of the traveler. Hence as the lever D, which stands behind the front head $e$ of the traveler, meets at its lower end the tappet-wheel $a^6$ of the goods-delivery mechanism the coin R in the bucket C will offer necessary resistance to the traveler to hold the lever D in vertical position and enable it to turn the tappet-wheel, and thereby move one of the slides $a^2$ on the table $a^3$ to deliver one piece of goods upon the chute $a^9$, whence it falls to the opening $a^{10}$ of the casing in reach of the purchaser. As the plunger is thus drawn outward, the coin R in the bucket C strikes the end $l$ of the rod L and carries the rod outward and causes it to turn the arm M of the motor N and wind the spring in readiness to unwind, and thereby operate the barrel O of the box P and produce music. These functions of the parts are illustrated in Fig. 9 of the drawings. As the plunger reaches its outermost position and after the lever D has actuated the tappet-wheel to cause delivery of a piece of goods, the lower end of the lever stands in front of the next following tappet of the wheel. Hence as the plunger is released and the spring $B^2$ commences to retract or draw it backward the lower end of the lever will be detained sufficiently by said following tappet to cause its upper end to be thrown backward and to push the retainer backward by contact with its wire loop or arm $f^4$, and thereby withdraw the retainer-stem $f'$ from under the coin and allow the coin to drop from the bucket C of the plunger into a receptacle $A^3$ in the casing. This action of the lever and coin-retainer is shown in Fig. 10 of the drawings. As the plunger about reaches its inmost or fully-retracted position, the lower end of the lever D slips over the arm of the tappet-wheel, and the spring $f^5$ then contracts and draws the retainer forward again to normal position with its stem $f'$ entered into the bucket-slot $c$, ready to retain the next coin passed downward into the bucket. As the retainer loop or arm $f^4$ is behind the upper part of the lever D, the retraction of the retainer by the spring $f^5$ will also carry the lever into normal upright position. As the plunger is retracted after the coin falls from its bucket, the lever-arm M is no longer detained by the rod L, and the spring-motor N then operates the music-box to produce music, as hereinbefore explained.

Should the plunger be drawn outward when a coin has not been first deposited in the plunger-bucket, neither the goods-delivery mechanism nor the music-box will be operated, and the parts will take the relative positions shown in Fig. 11 of the drawings. In this instance when the plunger B is drawn outward, there being no coin in the bucket C to resist the front stem $e^2$ of the traveler E, the lever D will simply be swung forward at the top by contact with the tappet-wheel arm and will slide the traveler E outward or forward as its stem $e^2$ moves in the central aperture of coin-bucket, and while the coin-retainer F is at rest. As the plunger thus moves outward, the opening or passage $c^3$ of the coin-bucket C will receive the end of the rod L, which, meeting no resistance by or from a coin, will not be moved outward, and consequently will not wind up the spring-motor of the music-box, and as the plunger is again retracted by its spring $B^2$ the parts will simply resume their normal positions ready to receive the next coin, which will cause delivery of a piece of goods and production of music as the plunger is operated, and as will readily be understood from the aforesaid description.

Having thus described my invention, I claim as new and desire to secure by Letters Patent—

1. In a coin-operated vending-machine, the combination, with a casing and a goods-delivery mechanism therein, of a plunger provided with a coin-bucket, a lever fulcrumed to and moving bodily with the plunger, and a traveler opposing the coin and opposed by the lever, substantially as described, whereby when the plunger is operated a coin retained in the bucket will hold the plunger-lever to enable it to actuate the goods-delivery mechanism.

2. In a coin-operated vending-machine, the combination, with a casing and a goods-delivery mechanism therein, consisting of an apertured table and one or more slides thereon and a tappet wheel or arm operating the slides, of a plunger provided with a coin-bucket, a lever fulcrumed to and moving bodily with the plunger, and a traveler opposing the coin and opposed by the lever, said lever adapted to actuate the tappet wheel or arm to operate the goods-delivery mechanism.

3. In a coin-operated vending-machine, the combination, with a casing and a goods-delivery mechanism therein, of a plunger provided with a coin-bucket, a lever, a traveler opposing the lever at one side, and a movable coin-retainer opposing the lever at its other side, substantially as described, whereby when the plunger is operated a coin retained in the bucket will hold the plunger-lever to enable it to actuate the goods-delivery mechanism, and as the plunger is retracted the lever will withdraw the retainer to drop the coin from the plunger-bucket.

4. In a coin-operated vending-machine, the combination, with a casing and a goods-delivery mechanism therein having a tappet wheel or arm as a prime motor, of a plunger provided with a coin-bucket, a lever, a traveler opposing the lever at one side, and a movable coin-retainer opposing the lever at the other side, said lever adapted to actuate the tappet wheel or arm to assure delivery of goods as the plunger holding a coin is moved in one direction, the lever being operated by said tappet wheel or arm to actuate the retainer and drop the coin as the plunger is retracted.

5. In a coin-operated vending-machine, the combination, with a casing, of a plunger therein provided with a coin-bucket, a movable retainer for the coin in the bucket, a lever adapted to push back the retainer, a lever or arm at the coin-slot of the casing, and a rod connecting these two levers, substantially as described, whereby as a coin is passed into the slot of the casing the retainer will be operated to allow a coin or other substance to fall from the coin-bucket of the plunger.

6. In a coin-operated vending-machine, the combination, with a casing and a goods-delivery mechanism therein having a tappet wheel or arm as a prime motor, of a plunger provided with a coin-bucket, a lever, and a traveler opposing the coin and opposed by the lever, a music-producing device in the casing, and a movable rod interposed between said device and a coin in the plunger-bucket, substantially as described, whereby as the plunger is operated the coin in the bucket will hold the plunger-lever to enable it to actuate the goods-delivery mechanism, and said coin will also actuate the rod to assure production of music.

7. In a coin-operated vending-machine, the combination, with a casing and a goods-delivery mechanism therein having a tappet wheel or arm as a prime motor, of a plunger B B', having a coin-bucket provided with a slot $c$ and a bracket-arm $c^4$, a lever D, fulcrumed to the part B' of the plunger and adapted to engage the tappet wheel or arm, a traveler moving in the coin-bucket and its arm $c^4$ and having a head or shoulder at the front of the lever, and a spring $e^4$, retracting the traveler and lever, substantially as described, for the purposes set forth.

8. In a coin-operated vending-machine, the combination, with a casing and a goods-delivery mechanism therein having a tappet wheel or arm as a prime motor, of a plunger B B', having a coin-bucket provided with a slot $c$ and a bracket-arm $c^4$, a lever D, fulcrumed to the part B' of the plunger and adapted to engage the tappet wheel or arm, a traveler moving in the bucket and its bracket-arm and having a head or shoulder at the front of the lever, a spring $e^4$, retracting the traveler and lever, and a coin-retainer having a stem $f'$ entering the coin-bucket and holding the coin therein and provided with an arm $f^3$, extending behind the lever D, substantially as described, for the purposes set forth.

9. In a coin-operated vending-machine, the combination, with a casing having a coin-admission slot and a plunger provided with a bucket having a coin-slot $c$, of a movable retainer for the coin in the bucket, having an arm $f^7$, a lever H on the bucket and adapted to engage the arm $f^7$, a cranked lever J at the coin-slot of the casing, and a rod I, connecting the levers H J, substantially as described, for the purposes set forth.

10. In a coin-operated vending-machine, the combination, with a casing, a plunger therein having a coin-bucket, a pivoted lever, and a traveler opposing the coin and opposed by the lever, of a sliding rod L, a music-box having a spring-motor N, and an arm M on the spring-winding shaft and opposed by the rod L, substantially as described, for the purposes set forth.

11. In a coin-operated vending-machine, the plunger made with a bucket having a coin-slot $c$, a front opening $c^3$, a bracket-arm $c^4$, a lever D, a traveler E, having opposite heads $e\ e$, connected by wires $e'\ e'$, between which the lever passes, having end stems $e^2\ e^3$, moving in the coin-bucket and its bracket, a spring $e^4$, retracting the traveler, a coin-retainer F, having end stems $f'\ f^2$ moving in the coin-bucket and its bracket and provided with a lateral arm $f^3\ f^4$, engaging the wires $e'\ e'$ of the traveler behind the lever D, and a spring $f^5$, retracting the retainer, substantially as described, for the purposes set forth.

FREDERIC B. COCHRAN.

Witnesses:
HENRY L. GOODWIN,
EDGAR TATE.